United States Patent [19]

Roelofs

[11] Patent Number: 4,580,798
[45] Date of Patent: Apr. 8, 1986

[54] AIR SUSPENSION SYSTEM FOR THE REAR END OF A MOTOR HOME

[76] Inventor: Robert E. Roelofs, 510 1st Ave. West, Edgerton, Minn. 56128

[21] Appl. No.: 670,204

[22] Filed: Nov. 13, 1984

[51] Int. Cl.[4] ............................................. B62D 37/00
[52] U.S. Cl. ..................................... 280/6 R; 280/698; 280/712; 280/714; 280/DIG. 1
[58] Field of Search ............. 280/6 R, 6 H, 693, 698, 280/702, 711, 713, 714, DIG. 1, 712

[56] References Cited

U.S. PATENT DOCUMENTS

| | | | |
|---|---|---|---|
| 2,964,311 | 12/1960 | Stelzer | 267/64.16 |
| 2,969,990 | 1/1961 | Szostak | 280/713 |
| 3,043,607 | 7/1962 | Ruffle | 280/710 |
| 3,071,394 | 1/1963 | Miller | 280/714 |
| 3,099,461 | 7/1963 | Stelzer | 280/714 |
| 3,181,853 | 5/1965 | Howell | 280/713 |
| 3,181,854 | 5/1965 | Backlund | 280/714 |
| 3,181,877 | 5/1965 | McHenry | 280/6 H |

FOREIGN PATENT DOCUMENTS 2042433 9/1980 United Kingdom ............... 280/713

Primary Examiner—John J. Love
Assistant Examiner—Kenneth R. Rice
Attorney, Agent, or Firm—Zarley, McKee, Thomte, Voorhees & Sease

[57] ABSTRACT

An air suspension system for the rear end of a motor home including a pair of longitudinally extending frames having a transversely extending axle housing positioned below the frames. The air suspension system comprises a pair of generally L-shaped arms pivotally secured at the forward ends thereof to the frame. An air bag is secured to the rearward end of each of the L-shaped arms and extends upwardly therefrom. The upper ends of the air bags are secured to laterally extending brackets which are secured to the frames. Each of the L-shaped arms are secured to the axle housing for movement therewith. An air pump is provided for supplying air to the interiors of the air bags as required. A level control is operatively connected to each of the L-shaped arms for sensing relative movement between the arms and the associated frame for controlling the flow of air into and out of the air bag.

8 Claims, 6 Drawing Figures

AIR SUSPENSION SYSTEM FOR THE REAR END OF A MOTOR HOME

BACKGROUND OF THE INVENTION

A vast majority of motor homes utilize a conventional truck chassis. Conventional truck chassis normally include a pair of leaf spring assemblies which connect the axle housing to the frame members. The conventional leaf spring suspension systems function very well on trucks but do not provide a very comfortable ride when utilized on motor homes.

Therefore, it is a principal object of the invention to provide an air suspension system for a vehicle such as a motor home.

A futher object of the invention is to provide a means for converting a conventional truck chassis so as to include an air suspension system.

Yet another object of the invention is to provide an air suspension system for a vehicle including a level control apparatus.

Yet another object of the invention is to provide a method of converting a conventional truck chassis on a motor home to an air suspension system in an economical fashion with a minimum of alteration to the truck chassis.

These and other objects will be apparatus to those skilled in the art.

SUMMARY OF THE INVENTION

Figure 1:
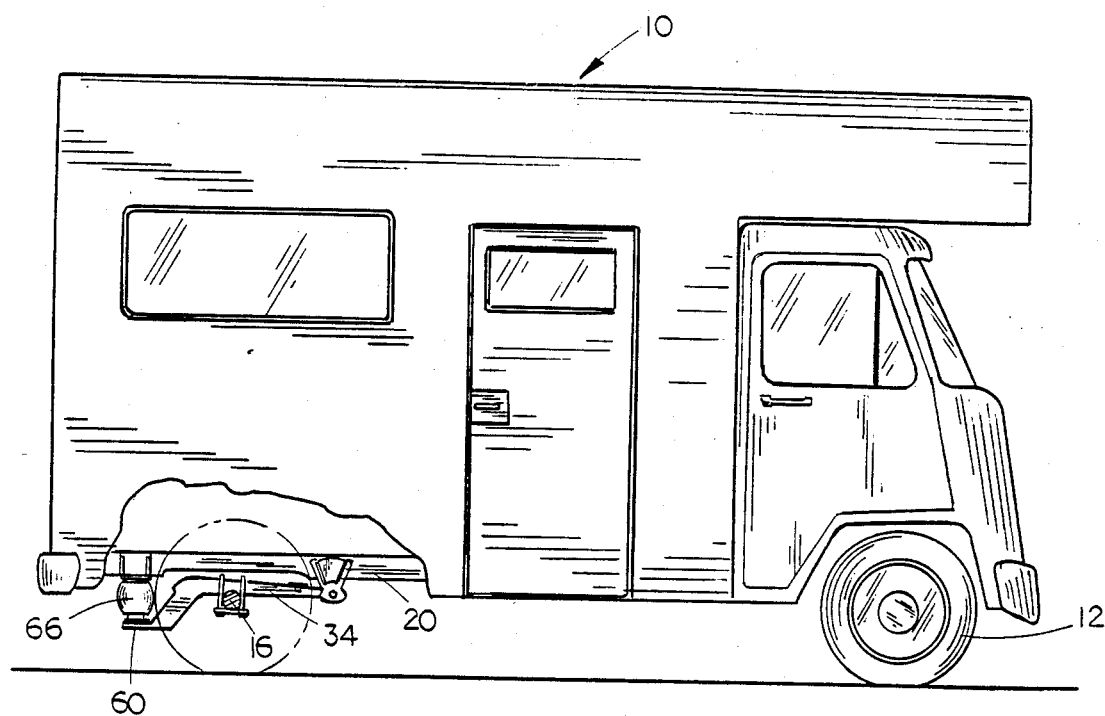
FIG. 1 is a side view of a conventional motor home with portions thereof broken away to illustrate the air suspension system of this invention.

The air suspension system described herein comprises a pair of generally L-shaped arms having their forward ends pivotally secured to the conventional spring shackles secured to the truck frame members. Downwardly and rearwardly extending arm portions are provided at the rearward ends of the L-shaped arms with each of the arms having an air bag secured to the lower rearward end thereof. The upper ends of the air bags are secured to laterally extending brackets mounted on the frame members. The L-shaped arms are secured to the axle housing by U-bolts or the like. An air tank and air pump are mounted on the truck frames adjacent the forward ends of the L-shaped arms and supply air to a pair of level gauges which are in fluid communication with the interiors of the air bags. The level gauges serve as an automatic height control in response to relative movement between the frame members and the L-shaped arms.

DESCRIPTION OF THE PREFERRED EMBODIMENT

The numeral 10 refers generally to a conventional motor home including a pair of front wheels 12 and a pair of rear wheels 14. The motor home 10 also includes a rear axle housing 16 through which axles extend for driving the wheels 14. Motor home 10 also includes a pair of longitudinally extending frame members 20 and 22 which are normally secured to the axle housing 16 by means of conventional leaf spring assemblies extending between the shackles 18 and 24 mounted on each of the frame members. To prepare the chassis of the motor home 10 for conversion to the air suspension system described herein, the conventional leaf spring assemblies are disconnected from the spring shackles and disconnected from the axle housing. Brackets 26 and 28 are secured to frame members 20 and 22, respectively, by welding or the like.

Figure 3:
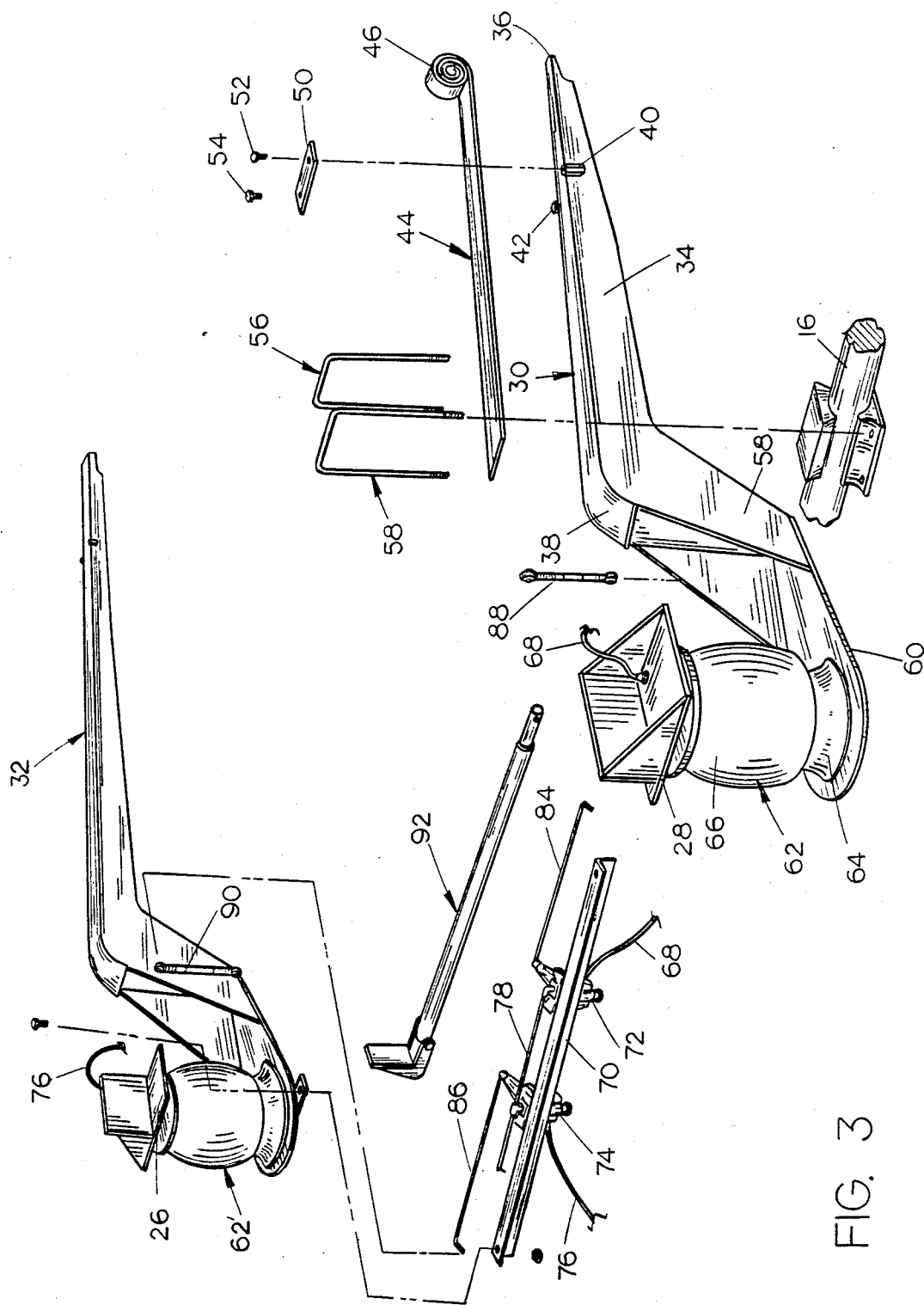
FIG. 3 is an exploded perspective view of the air suspension system of this invention.
Figure 4:
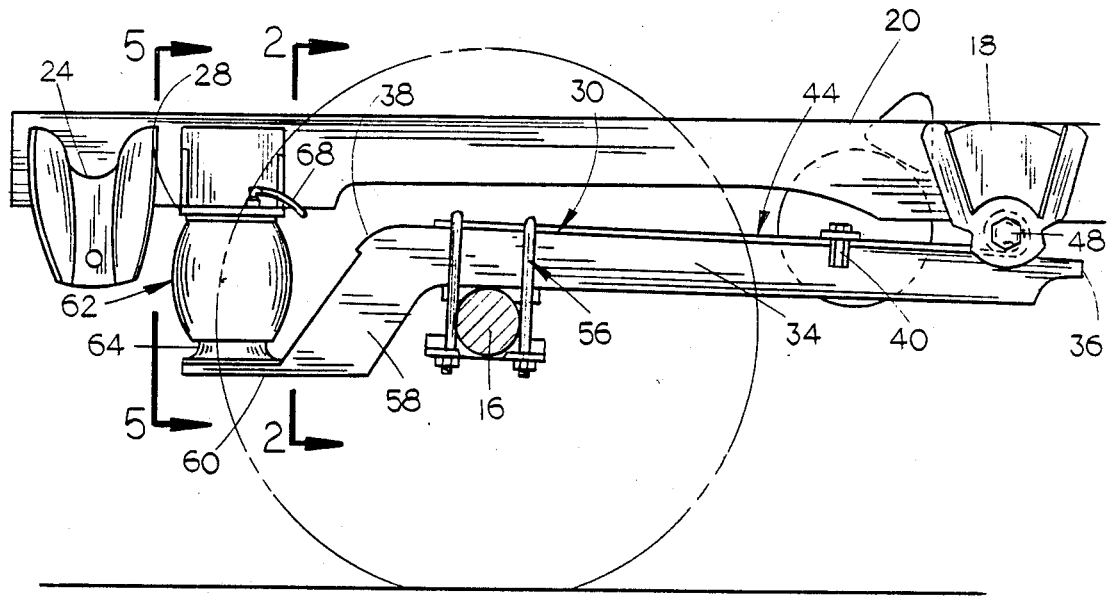
FIG. 4 is a longitudinal sectional veiw.
Figure 5:
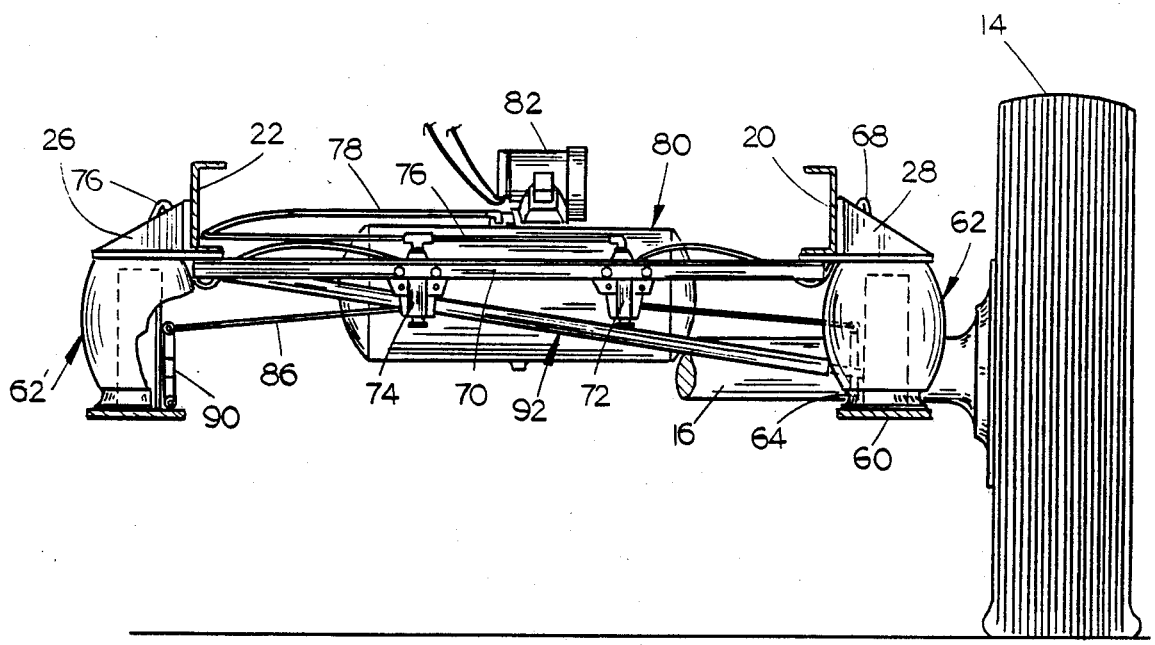
FIG. 5 is a sectional view as seen on lines 5—5 of FIG. 4.

The suspension system of this invention generally comprises a pair of generally L-shaped arms 30 and 32. Inasmuch as the arms 30 and 32 are identical, only arm 30 will be described in detail. Arm 30 includes a generally horizontally disposed top portion 34 having a forward end 36 and a rearward end 38. A pair of nuts 40 and 42 are welded to the sides of top portion 34 as seen in FIG. 3. The forward end of arm 30 is pivotally secured to frame member 22 by means of the leaf spring 44. The forward end 46 of leaf spring 44 is secured to the conventional spring shackle 18 by means of bolt 48. The rearward portion of leaf spring 44 is in engagement with the upper surface of the top portion of arm 30 and is secured thereto by means of plate 50 extending thereover and being maintained in position by means of bolts 52 and 54 being received by the nuts 40 and 42, respectively. U-bolt assemblies 56 and 58 also aid in securing the leaf spring 44 to the arm 30. Further, the U-bolt assemblies 56 and 58 also secure the arm 30 to the axle housing 16 as seen in the drawings.

Arm 30 includes a downwardly and rearwardly extending portion 58 which has a rearwardly extending plate or paddle 60 secured to the lower rearward end thereof. The numeral 62 refers to a conventional air bag including a lower rigid metal portion 64 and a flexible bag portion 66. The upper end of the air bag 62 is secured to the bracket 28. Air line 68 extends from the bracket 28 and is in fluid communication with the interior of the air bag 62.

Figure 2:
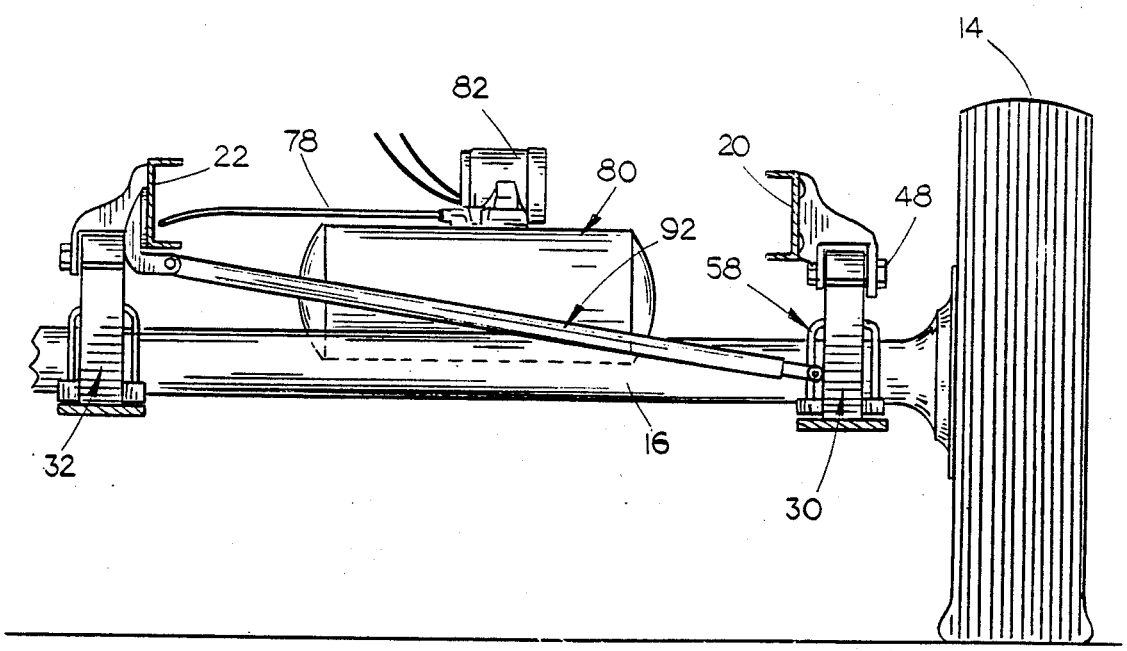
FIG. 2 is a partial sectional view of the air suspension system of this invention.
Figure 6:
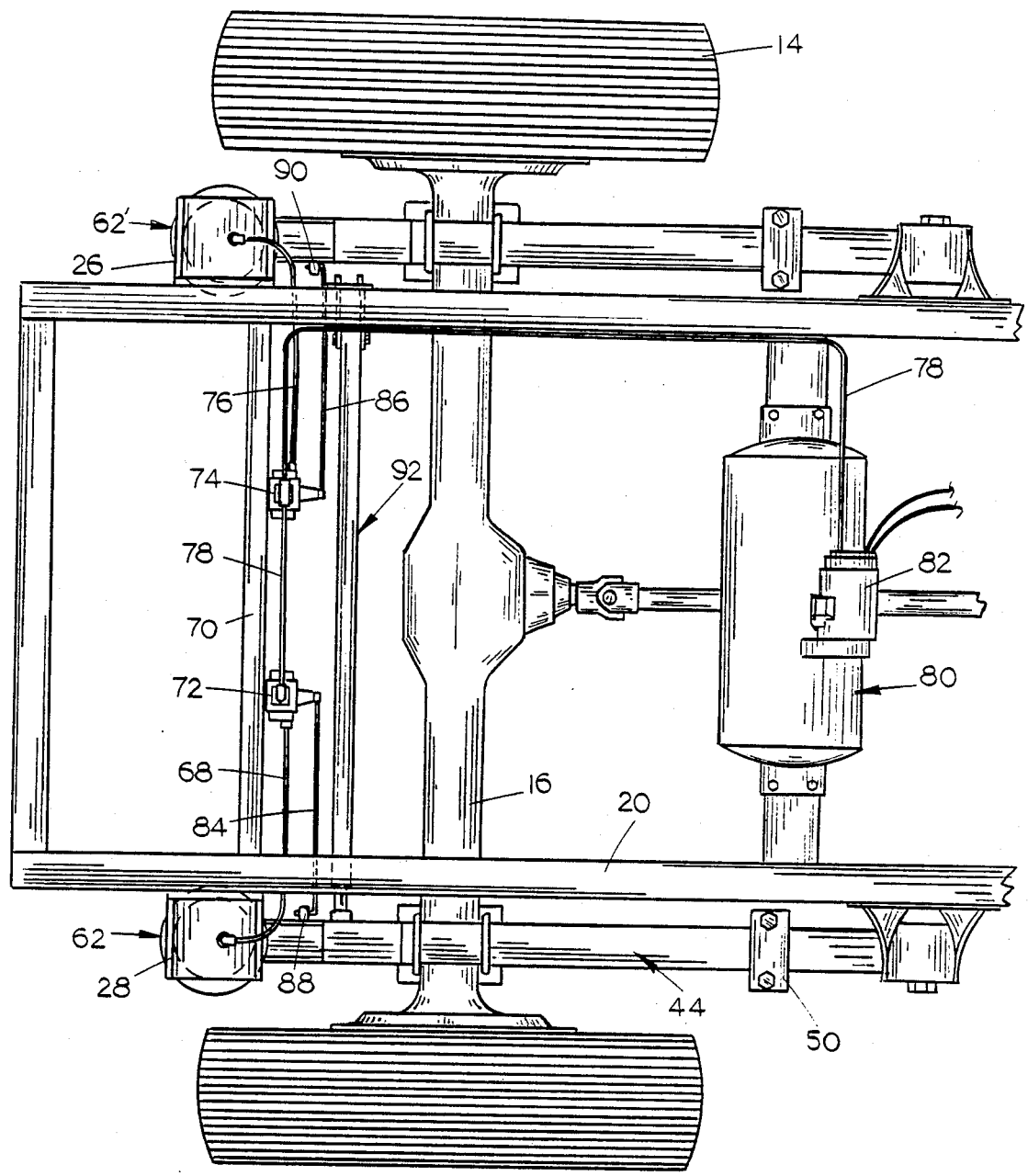
FIG. 6 is a top elevational view of the air suspension system of this invention mounted on a truck chassis.

Support 70 is secured to brackets 26 and 28 and extends therebetween. A pair of level gauges 72 and 74 are mounted on the support 70 as seen in FIG. 3. Line 68 extends from guage 72 to the interior of air bag 62. Air line 76 extends from gauge 74 to the interior of air bag 62'. Air line 78 is connected to the gauges 72 and 74 and extends to the air pump and tank assembly 80 which is mounted between the frame members 20 and 22 as seen in FIG. 6. The pump 82 is of the 12 volt type and is connected to the electrical system of the motor home. Control arms 84 and 86 are connected to the gauges 72 and 74, respectively, and extend therefrom for connection with the links 88 and 90, respectively. Torque arm 92 has one end secured to frame member 22 and its other end secured to arm 30 as seen in FIG. 2.

In operation, the air pump 82 will supply air to the gauges 72 and 74 which in turn supply air to the interiors of the bags 62 and 62' to provide an "air ride" type of suspension which is vastly superior to the conventional leaf spring suspension found on conventional trucks. If the motor home is heavily loaded, the frame members 20 and 22 will tend to lower with respect to the axle housing 16 and the arms 30 and 32 and such lowering movement will be sensed by the gauges 72 and 74 through the control arms 84, 86 and links 88, 90.

Sensing of the lowering of the frame members 20 and 22 will cause additional air to be supplied to the interiors of the air bags 62 and 62' so as to raise the frame members 20 and 22 to the proper position. Relative movement between individual frame members and its associated arm is also sensed by one of the gauges 72 and 74 so that air may be supplied to a single air bag so that the motor home will be level.

Thus it can be seen that a novel air suspension has been described which permits a conventional truck chassis utilized on a motor home to be modified so as to provide an air suspension insuring a smooth and stable ride. The air suspension system described herein permits the modification of a conventional truck chassis with a minimum of alteration thereto in a most economical fashion. Although the invention described herein is ideally suited for motor homes, the invention is equally well adapted for use on other vehicles such as ambulances, etc. Thus it can be seen that the air suspension system of this invention accomplishes at least all of its stated objectives.

I claim:

1. An improved suspension system for the rear end of a conventional vehicle chassis of the type including a pair of longitudinally extending frames having rearward and forward ends, a transversely extending axle housing positioned below said frames and having an axle thereon with wheels secured to the outer ends thereof, and including a leaf spring for biasing said axle housing away from each of said frames, each said leaf spring being pivotally connected at its front end to said frames, the rear portion of each said spring having been removed, the improvement comprising:
    a generally L-shaped arm secured to the front portion of each said spring, each of said L-shaped arms comprising an elongated upper portion having rearward and forward ends, and a downwardly extending portion at the rearward end thereof,
    each of said L-shaped arms being secured to said axle housing,
    an air bag means secured to the rearward end of each of said L-shaped arms,
    each of said air bag means having upper and lower ends, the lower end of each of said bag means being operatively secured to one of said downwardly extending portions, the upper end of each of said bag means being operatively secured to one of said frames,
    an air pump means for supplying air to the interiors of said air bag means,
    and control means operatively connected to at least one of said frames and at least one of said L-shaped arms for controlling the flow of air into and out of said air bag means in response to angular changes between said one frame and said one arm.

2. The structure of claim 1 wherein said vehicle chassis has a motor home mounted thereon.

3. The structure of claim 1 wherein an air tank and said air pump means are mounted between said frames adjacent the forward ends of said L-shaped arms.

4. The structure of claim 3 wherein said downwardly extending portions of said arms extend downwardly and rearwardly, and wherein a plate is secured to and extends rearwardly from the lower end of said downwardly extending portions, the lower ends of said air bag means being mounted on said plate.

5. The structure of claim 4 wherein a laterally extending bracket is secured to each of said frames above one of said plates, the upper ends of said air bag means being secured to said brackets.

6. The structure of claim 1 wherein said control means comprises a pair of level gauges operatively mounted on said frames, each of said gauges having a control arm secured thereto and which is also secured to one of said L-shaped arms for sensing relative movement between the said one frame and the said one arm.

7. The structure of claim 1 wherein a transversely extending torque arm is secured to and extends between one of said frames and the L-shaped arm which is positioned adjacent the other frame.

8. The method of improving the suspension system for the rear end of a conventional vehicle chassis of the type including a pair of longitudinally extending frames having rearward and forward ends, a transversely extending axle housing positioned below said frame and having an axle thereon with wheels secured to the outer ends thereof, and including a leaf spring for biasing said axle housing away from each of said frames, each said leaf spring being connected to said axle housing and pivotally connected at its front end and rear end to said frames, comprising the steps of:
    disconnecting the rear end of said conventional leaf springs from said frames;
    disconnecting the axle housing from said leaf springs;
    removing the rear portion of each said leaf spring from the front portion thereof;
    securing a generally L-shaped arm to the front portion of each said leaf spring, each of said L-shaped arms comprising an elongated upper portion having rearward and forward ends, and a downwardly extending portion at the rearward end thereof;
    securing each of said L-shaped arms to said axle housing;
    operatively securing an air bag means to the rearward end of each of said L-shaped arms;
    operatively securing the lower end of each of said air bag means to one of said downwardly extending portions of said L-shaped arms;
    operatively securing the upper end of each of said air bag means to one of said frames;
    securing an air pump means to said frames for supplying air to the interiors of said air bag means;
    and operatively connecting control means to at least one of said frames and at least one of said L-shaped arms for controlling the flow of air into and out of said air bag means in response to angular changes between said one frame and said one arm.

* * * * *